United States Patent

[11] 3,603,826

| [72] | Inventor | Simon Saretzky<br>Sands Point, N.Y. |
|---|---|---|
| [21] | Appl. No. | 872,923 |
| [22] | Filed | Oct. 31, 1969 |
| [45] | Patented | Sept. 7, 1971 |
| [73] | Assignee | IMC Magnetics Corporation |

[54] ROTOR-STATOR ASSEMBLY HAVING REDUCED INERTIA
8 Claims, 5 Drawing Figs.

[52] U.S. Cl. .................................................. 310/266,
310/44, 310/154
[51] Int. Cl. ...................................................... H02k 1/22
[50] Field of Search ........................................... 310/162,
154, 156, 49, 266, 263, 156, 44

[56] References Cited
UNITED STATES PATENTS
2,913,819  11/1959  Andreotti ..................... 310/44

| 2,958,035 | 10/1960 | Binggeli | 310/266 |
|---|---|---|---|
| 3,102,964 | 9/1963 | Bennet | 310/266 |
| 3,152,275 | 10/1964 | Aske | 310/266 |
| 3,237,036 | 2/1966 | Konig | 310/266 |
| 3,466,476 | 9/1969 | Snowdon | 310/49 |

*Primary Examiner*—D. X. Sliney
*Assistant Examiner*—R. Skudy
*Attorney*—Herzig & Walsh ABSTRACT: A stator rotor and permanent magnet assembly constituting a stepper motor or induction-type generator having reduced inertia. A nonrotating permanent magnet is provided. A rotor is configured to have a part rotating in a gap between the stator poles and the permanent magnet. The permanent magnet is mounted at one end from the housing so that the magnetic field is through the stator poles axially of the permanent magnet and through a part of the housing.

PATENTED SEP 7 1971　　　3,603,826
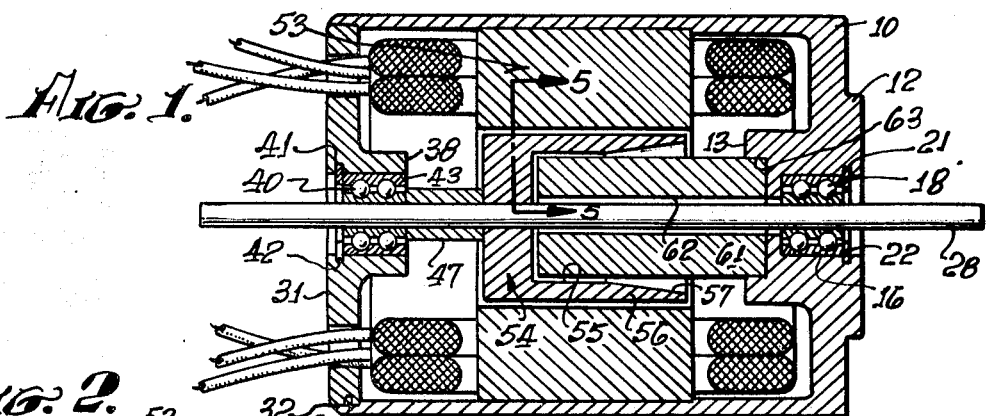
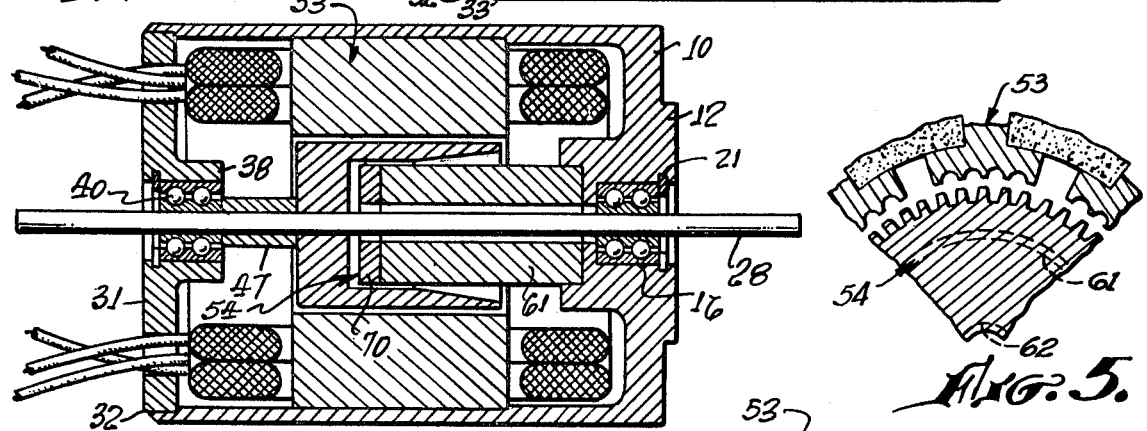
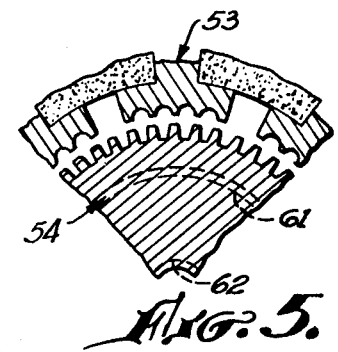
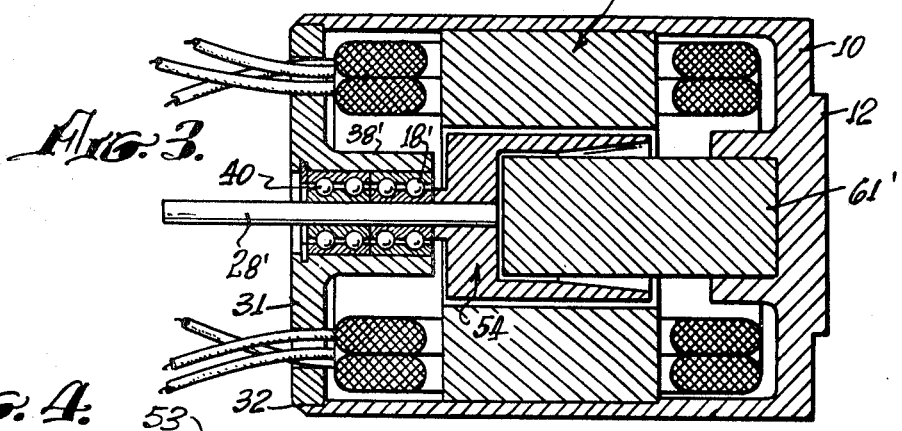
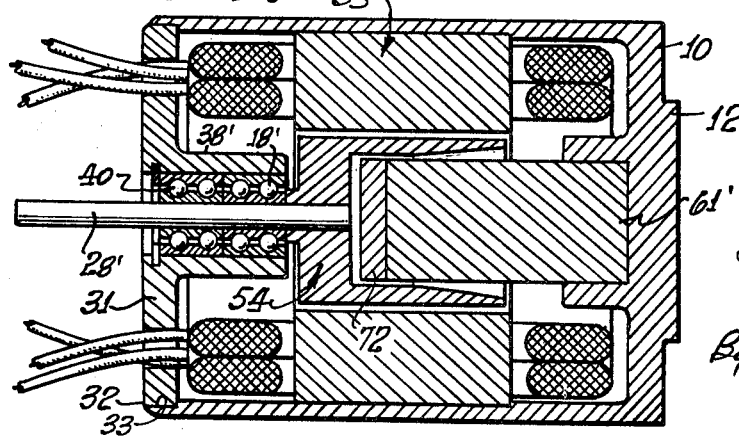
INVENTOR.
SIMON SARETZKY,
By
Herzig & Walsh
ATTORNEYS.

ROTOR-STATOR ASSEMBLY HAVING REDUCED INERTIA

SUMMARY OF THE INVENTION

This invention relates to an improved electrical machine, more particularly of the type adapted for use as a stepper motor designed to be operated in small discrete steps or as an induction generator for generating high frequency. In an exemplary form of the invention, in the form of a synchronous stepper motor, it is designed to have 200 discrete steps having a magnitude of 1.8°. The invention, however, may be embodied in constructions having other numbers of steps. The invention is an improvement on the motor of U.S. Pat. No. 3,428,837. Its construction may be like that of the said patent except for specific improvements outlined herein.

The improvements in the device reside in the construction of the rotor; the arrangement and assembly of the rotor, stator, and housing; and the arrangement of the stator poles and windings. Although the exemplary embodiment is described as a stepper motor, the invention may be embodied in generators as referred to above.

Having reference to the rotor assembly, in stepper motors it is, of course, desirable to provide for a relatively large number of steps yet with accurate stepping action. In motors of this type the faces of the stator poles are provided with teeth extending axially and the rotor has teeth which move adjacent to the teeth on the stator poles. To realize the desired number of steps, a substantial number of teeth are required on the rotor. However, it is also desired to keep the rotor relatively small and compact. Inertia of the rotor is a very important factor involved in stepper motors of this type. Reduction of inertia is a primary object of the invention. In the exemplary embodiment of this invention, this object and others are realized by way of a particular rotor construction and relative arrangement of the stator, rotor, and motor housing. The motor includes a permanent magnet cylinder which is axially magnetized. Only one pole shoe is provided and it constitutes the rotor. It has a skirt of the same axial length as the axial dimension of the stator pole faces and peripheral teeth are provided on it. The magnet cylinder is mounted from an end cap of the housing and does not rotate. The magnetic field is through a stator pole, through the rotor, through the magnet, and through part of the motor housing. This reduces the number of rotating parts from three to one. Inertia is proportionately reduced and the capability of the motor for its purpose is similarly increased. This same object can be realized, as described, in generators.

Further objects and additional advantages of the invention will become apparent from the following detailed description and annexed drawings wherein:

FIG. 1 is a cross-sectional view of a preferred form of the motor assembly of the invention;

FIG. 2 is a sectional view of a modified form of motor having a radial gap provided by a soft iron disc on the end of the magnet.

FIG. 3 is a sectional view of motor like that of FIG. 1 with cantilever bearing.

FIG. 4 is a sectional view of a motor like that of FIG. 2 with cantilever bearing.

FIG. 5 is a partial sectional view taken along line 5—5 of FIG. 1.

Referring now more in detail to FIG. 1 of the drawing, the motor in the exemplary form shown comprises a generally cylindrical magnetically permeable housing 10. The right end of the housing has an extending boss 12 and an inwardly extending boss 13. In the end there is a bore 16 which receives a bearing designated generally at 18 which includes conventional ball races and balls. The ball bearing is held by snapring 21 received in an annular groove 22 in the bore 16. Shaft 28 is journaled in bearing 18; and the other end bearing.

At the other end of the motor housing 10 is an end cap 31 having an outer bevelled edge 32. It is received in a counterbore 33 in the end of housing 10. The end cap 31 has an inwardly extending boss 38 in which is received a second ball bearing 40 having conventional ball races and balls. The ball bearing is held in place by a snapring 41 received in an annular groove 42 in the bore 43 in the end cap 31. Numeral 47 designates a cylindrical nonmagnetic spacer member which fits between bearing 40 and the rotor.

Referring to the stator assembly, it is of laminated construction, as designated generally at 53 in the figures. It comprises a cylindrical structure fitting within the housing 10 and having inwardly extending poles of which there may be eight for example as in U.S. Pat. No. 3,428,837. The poles have enlarged end faces which are arcuate and positioned adjacent the periphery of the rotor. The pole faces have axial teeth; in the construction shown, each pole face has five teeth with four spaces between the teeth, as in U.S. Pat. No. 3,428,837 and the windings may be the same as in that patent.

The rotor is designated by the numeral 54. It has a bore 55 forming a skirt 56 which has an inside end taper 57. The permanent magnet cylinder 61 has a bore 62 through which the shaft 28 passes. As may be seen the end of magnet 61 is within pole shoe 54 which is the rotor and the other end of magnet 61 is supported in counterbore 63 in boss 13. The magnet could be supported by either an end cap or the housing.

The rotor 54 with its skirt has substantially the same axial extent as the axial extent of the stator pole faces. The magnet 61 is displaced axially from the stator poles. The rotor 54 rotates within the stator poles. The boss 13 is part of the magnetic motor housing. There is only one pole shoe.

The pole shoe (i.e.) rotor 54 has peripheral teeth similar to those on the faces of the stator poles. It has 50 such teeth evenly spaced on the outside diameter. The arrangement of stator poles and numbers of teeth may be as in U.S. Pat. No. 3,428,837.

FIG. 2 shows a construction like that of FIG. 1 with the difference that soft iron disc 70 is attached to the end of the permanent magnet 61 thus providing a radial airgap between it and the rotor or pole shoe 54.

FIG. 3 shows a modified construction in which the rotor 54 is cantilever mounted on the shaft 28'. The bearing 40 is like that of the previous embodiments. The boss 38' is extended and mounted in it are both the bearing 40 and the bearing 18' which in FIGS. 1 and 2 are at opposite ends of the housing. The shaft 28' is cantilever mounted in the two bearings as shown with the rotor 54 on the end of the shaft.

FIG. 4 shows another modified form of the invention which is basically like the construction of FIG. 1 but embodies the different features of both FIGS. 2 and 3. That is it has a soft iron disc 72 attached to the end of the permanent magnet 61' which as in FIG. 3 does not have an axial bore. Thus a radial airgap is provided. The bearing structure is like that of FIG. 3 with the shaft 28' cantilever mounted journaled in the two bearings with the rotor 54 on the end of the shaft.

From the foregoing those skilled in the art will readily understand the nature of the construction and operation of the invention and the manner in which it achieves and realizes all of the objects and results as set forth in the foregoing. It is apparent that the inertia of the rotating part of the device has been very substantially reduced. Instead of having three rotating parts comprising a permanent rotating magnet and two pole shoes, there is only one rotating part which is the pole shoe which is the rotor. The magnetic circuit is however like that of U.S. Pat. No. 3,428,837 with all the advantages accruing therefrom.

The rotor, that is the pole shoe, can be fabricated in various different ways and from different materials. Preferably however it is fabricated using a powdered metal process, the pole shoe as thus fabricated rotating around the end of the stationary permanent magnet and within the poles of the stator core.

The foregoing disclosure is representative of preferred forms of the invention and is to be interpreted in an illustrative rather than limiting sense.

What is claimed is:

1. A rotor and stator assembly comprising a laminated stator core assembly having poles with windings thereon, a shaft having an open-ended cylindrical rotor thereon, a cylindrical nonrotatable permanent magnet fixedly mounted at one end thereof relative to said stator core, housing means supporting said magnet and said stator core and having a portion abutting said one end of said magnet and defining a continuous flux path from said one end to said stator core, said magnet being axially magnetized, said rotor having a part positioned to rotate adjacent the other end surface of said magnet and a cylindrical part between the surfaces of the stator poles and the permanent magnet in an air gap directly between said stator assembly and the sides of said permanent magnet.

2. A structure as in claim 1 wherein said rotor has a part having an axial dimension approximately the same as the axial dimension of the faces of the stator poles.

3. A structure as in claim 1 wherein the cylindrical part of said rotor is a skirt concentrically positioned between the stator pole faces and the permanent magnet.

4. A structure as in claim 1 wherein the said permanent magnet is displaced axially from the stator poles, the rotor having a part having substantially the same axial dimension as the faces of the stator poles.

5. A structure as in claim 1 wherein said pole faces have teeth formed therein and said rotor has peripheral teeth rotatable adjacent the teeth on the pole faces.

6. A structure as in claim 1 wherein said permanent magnet has a soft iron member at one end forming a radial airgap.

7. A structure as in claim 1 wherein the said shaft is cantilever mounted in bearing means at one end of the housing.

8. A structure as in claim 7 wherein said permanent magnet has a soft iron member at one end forming a radial airgap.